(12) United States Patent
Maheshwari et al.

(10) Patent No.: US 9,113,429 B2
(45) Date of Patent: Aug. 18, 2015

(54) METHOD TO INCREASE THE PROBABILITY OF HANDOVER MESSAGE BEING RECEIVED BY RECEIVER

(75) Inventors: Shailesh Maheshwari, San Diego, CA (US); Thomas Klingenbrunn, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 480 days.

(21) Appl. No.: 12/487,217

(22) Filed: Jun. 18, 2009

(65) Prior Publication Data

US 2009/0318153 A1 Dec. 24, 2009

Related U.S. Application Data

(60) Provisional application No. 61/073,994, filed on Jun. 19, 2008.

(51) Int. Cl.
| | |
|---|---|
| *H04B 7/005* | (2006.01) |
| *H04W 52/40* | (2009.01) |
| *H04W 36/00* | (2009.01) |
| *H04W 36/34* | (2009.01) |
| *H04L 1/18* | (2006.01) |
| *H04W 28/04* | (2009.01) |

(52) U.S. Cl.
CPC ............. *H04W 52/40* (2013.01); *H04L 1/189* (2013.01); *H04W 36/0055* (2013.01); *H04L 1/1812* (2013.01); *H04W 28/04* (2013.01)

(58) Field of Classification Search
None
See application file for complete search history.

(56) References Cited

U.S. PATENT DOCUMENTS

| | | | |
|---|---|---|---|
| 6,442,150 B1 | 8/2002 | Kondo et al. | |
| 7,957,352 B2 | 6/2011 | Vanghi et al. | |
| 2002/0039901 A1 | 4/2002 | Sugimoto | |
| 2002/0060997 A1* | 5/2002 | Hwang | 370/335 |
| 2006/0239238 A1 | 10/2006 | Fernandez-Corbaton et al. | |
| 2008/0081651 A1 | 4/2008 | Kuroda et al. | |

(Continued)

FOREIGN PATENT DOCUMENTS

| | | |
|---|---|---|
| CN | 1887020 | 12/2006 |
| CN | 102067688 A | 5/2011 |

(Continued)

OTHER PUBLICATIONS

"3GPP TS 36.300 V8.5.0 (May 2008) 3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 8)" 3GPP TS 36.300 V8.5.0, vol. 36.300, No. V8.5.0, May 1, 2008, pp. 1-134, XP002532523, paragraphs [0006], [6.1.1]-[6.1.2] paragraphs [0009], [09.1]-[09.3] paragraphs [10.1.2.1]-[10.1.2.3].

(Continued)

*Primary Examiner* — Eunsook Choi
(74) *Attorney, Agent, or Firm* — Liem T. Do

(57) ABSTRACT

A method for wireless communications is provided. The method includes triggering a handover process across a wireless network and generating handover messages on more than a single communications process to facilitate receipt of the handover messages. The method can include increasing the power associated with a communications channel in order to facilitate receipt of the handover messages and can also include generating multiple messages that also are increased in power by the communications channel.

41 Claims, 11 Drawing Sheets

(56) References Cited

U.S. PATENT DOCUMENTS

| | | | |
|---|---|---|---|
| 2008/0123595 A1* | 5/2008 | Lindheimer et al. | 370/331 |
| 2008/0186944 A1* | 8/2008 | Suzuki et al. | 370/349 |
| 2009/0129335 A1* | 5/2009 | Lee et al. | 370/331 |
| 2009/0310534 A1* | 12/2009 | Lindskog et al. | 370/328 |
| 2010/0118781 A1* | 5/2010 | Petrovic et al. | 370/328 |
| 2010/0142485 A1* | 6/2010 | Lee et al. | 370/331 |
| 2010/0192035 A1* | 7/2010 | Sagfors et al. | 714/748 |
| 2010/0220647 A1* | 9/2010 | Baker et al. | 370/328 |
| 2010/0240367 A1* | 9/2010 | Lee et al. | 455/435.2 |
| 2010/0279695 A1* | 11/2010 | Amirijoo et al. | 455/438 |
| 2012/0147855 A1* | 6/2012 | Pani et al. | 370/331 |

FOREIGN PATENT DOCUMENTS

| | | |
|---|---|---|
| JP | 11355243 | 12/1999 |
| JP | 2002112310 A | 4/2002 |
| JP | 2003078938 A | 3/2003 |
| JP | 2004356993 A | 12/2004 |
| WO | WO2006016457 A1 | 2/2006 |
| WO | WO2006101368 A1 | 9/2006 |
| WO | WO2006105316 A2 | 10/2006 |
| WO | WO2007127097 A2 | 11/2007 |

OTHER PUBLICATIONS

International Search Report and Written Opinion—PCT/US2009/048050—ISA/EPO—Nov. 6, 2009.

QUALCOMM Europe: "Retransmission of NAS messages on the uplink during inter eNB Handover" 3GPP Draft; C1-081138, 3rd Generation Partnership Project (3GPP), Mobile Competence Centre ; 650, Route Des Lucioles ; F-06921 Sophia-Antipolis Cedex ; France, vol. CT WG1, No. Jeju Island; Mar. 31, 2008, XP050028428, [retrieved on Mar. 31, 2008] the whole document.

Samsung: "UL synchronized handover" 3GPP Draft; R2-073312, 3rd Generation Partnership Project (3GPP), Mobile Competence Centre ; 650, Route Des Lucioles ; F-06921 Sophia-Antipolis Cedex; France, vol. RAN WG2, no. Athens, Greece; Aug. 14, 2007, XP050136025 [retrieved on Aug. 14, 2007] p. 1, paragraphs 2,3.2 pp. 2-5.

* cited by examiner

METHOD TO INCREASE THE PROBABILITY OF HANDOVER MESSAGE BEING RECEIVED BY RECEIVER

CLAIM OF PRIORITY UNDER 35 U.S.C. §119

This application claims the benefit of U.S. Provisional Patent Application No. 61/073,994, entitled METHOD TO INCREASE THE PROBABILITY OF HANDOVER MESSAGE BEING RECEIVED BY RECEIVER, and filed on Jun. 19, 2008, the entirety of which is incorporated herein by reference.

BACKGROUND

I. Field

The following description relates generally to wireless communications systems, and more particularly to scheduling and processing of high speed data packets for wireless networks.

II. Background

Wireless communication systems are widely deployed to provide various types of communication content such as voice, data, and so forth. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems including E-UTRA, and orthogonal frequency division multiple access (OFDMA) systems.

An orthogonal frequency division multiplex (OFDM) communication system effectively partitions the overall system bandwidth into multiple ($N_F$) subcarriers, which may also be referred to as frequency sub-channels, tones, or frequency bins. For an OFDM system, the data to be transmitted (i.e., the information bits) is first encoded with a particular coding scheme to generate coded bits, and the coded bits are further grouped into multi-bit symbols that are then mapped to modulation symbols. Each modulation symbol corresponds to a point in a signal constellation defined by a particular modulation scheme (e.g., M-PSK or M-QAM) used for data transmission. At each time interval that may be dependent on the bandwidth of each frequency subcarrier, a modulation symbol may be transmitted on each of the $N_F$ frequency subcarrier. Thus, OFDM may be used to combat inter-symbol interference (ISI) caused by frequency selective fading, which is characterized by different amounts of attenuation across the system bandwidth.

Generally, a wireless multiple-access communication system can concurrently support communication for multiple wireless terminals that communicate with one or more base stations via transmissions on forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

A MIMO system employs multiple (NT) transmit antennas and multiple (NR) receive antennas for data transmission. A MIMO channel formed by the NT transmit and NR receive antennas may be decomposed into NS independent channels. Generally, each of the NS independent channels corresponds to a dimension. The MIMO system can provide improved performance (e.g., higher throughput and/or greater reliability) if the additional dimensionalities created by the multiple transmit and receive antennas are utilized. A MIMO system also supports time division duplex (TDD) and frequency division duplex (FDD) systems. In a TDD system, the forward and reverse link transmissions are on the same frequency region so that the reciprocity principle allows estimation of the forward link channel from the reverse link channel. This enables an access point to extract transmit beam-forming gain on the forward link when multiple antennas are available at the access point.

Currently, mobility between cells is by means of "hard handover", where an old link is disabled before a new link is established. This is contrary to "soft handover" generally used in CDMA networks, where the new link is established before the old link is disabled. In case of hard handover, all handover messages are sent only via the now weakest (and deteriorating) radio link from the old cell. This implies that a handover message is at greater risk to be lost in a hard handover scenario since in a soft handover, the handover message can be sent from both cells, thereby improving reliability. Handover message results in Radio Link Control (RLC) reset and data transfer is stalled until the handover complete message is sent out of user equipment (UE) after handover. Handover stalls are also dependent on the time taken by the UE to receive a configuration message which triggers handover. Since the UE is likely to be in poor cell coverage at the time of handover, the probability of delay in receipt of handover message is high.

SUMMARY

The following presents a simplified summary in order to provide a basic understanding of some aspects of the claimed subject matter. This summary is not an extensive overview, and is not intended to identify key/critical elements or to delineate the scope of the claimed subject matter. Its sole purpose is to present some concepts in a simplified form as a prelude to the more detailed description that is presented later.

Systems and methods provide multiple communications options which can be deployed by a wireless network to increase probability of the receipt of a handover configuration message by user equipment (UE). The respective options reduce the stall time of data transfer during handover by increasing the probability of receipt of handover configuration message by the UE which in turn results in improved handover performance. In one aspect, a quick repeat of handover messages by the network is provided. Thus, when handover is triggered, the network can automatically transmit handover messages on more than a single Hybrid Automatic Repeat Request (HARQ) process, for example. In another aspect, transmission of handover messages with higher power can be provided, where the network can selectively increase the power of channels based on a higher layer indication of whether a given transmission carries a handover message or not. In yet another aspect, a hybrid approach may be employed where multiple handover messages are generated and increased power is provided for the respective messages in order to further increase the probability of message receipt.

To the accomplishment of the foregoing and related ends, certain illustrative aspects are described herein in connection with the following description and the annexed drawings. These aspects are indicative, however, of but a few of the various ways in which the principles of the claimed subject matter may be employed and the claimed subject matter is intended to include all such aspects and their equivalents. Other advantages and novel features may become apparent

DETAILED DESCRIPTION

Systems and methods are provided to increase the probability of receipt of handover messages in a wireless communications system. In one aspect, a method for wireless communications is provided. The method includes employing a processor executing computer executable instructions stored on a computer readable storage medium to implement various acts or processes. The method includes triggering a handover process across a wireless network and generating handover messages on more than a single communications process to facilitate receipt of the handover messages. The method can include increasing the power associated with a communications channel in order to facilitate receipt of the handover messages and can also include generating multiple messages that also have increased power provided by the communications channel.

Figure 1:
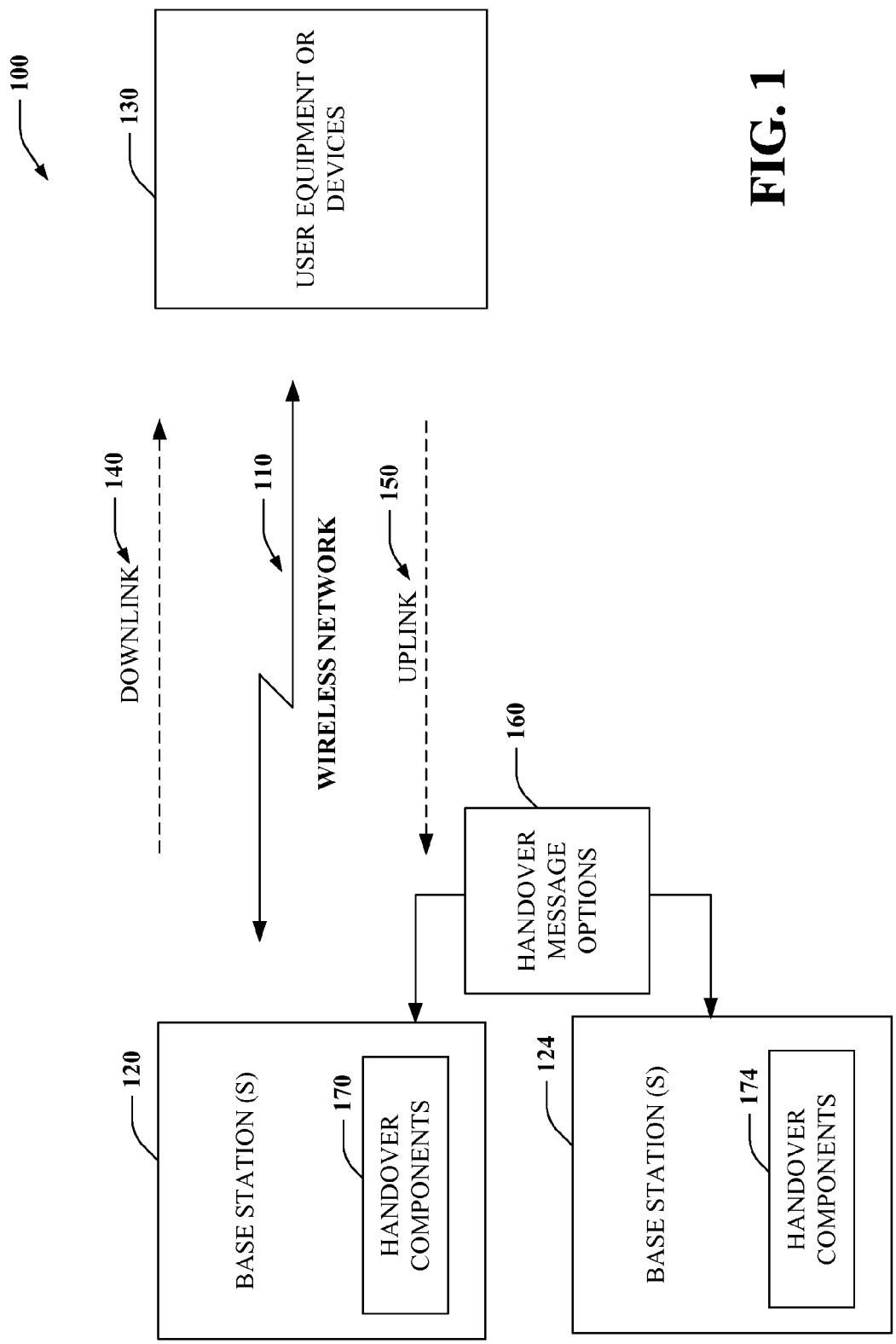
FIG. 1 is a high level block diagram of a system that provides various handover message communication options for a wireless communications system.

Referring now to FIG. 1, a system 100 provides various handover message communications options for a wireless communications system, where the options are employed to increase the efficiency of cell handover between stations, devices, or channels. The system 100 includes one or more base stations 120, 124 (also referred to as a node, evolved node B—eNB, femto station, pico station, and so forth) which can be an entity capable of communication over a wireless network 110 to a second device 130 (or devices). For instance, each device 130 can be an access terminal (also referred to as terminal, user equipment, station or mobile device). The base stations 120 or 124 communicate to the device 130 via downlink 140 and receive data via uplink 150. Such designation as uplink and downlink is arbitrary as the device 130 can also transmit data via downlink and receive data via uplink channels. It is noted that although three components 120, 124, and 130 are shown, that more than three components can be employed on the network 110, where such additional components can also be adapted for the wireless processing and message generation described herein.

As shown, handover message options 160 are processed between the base station 120 and 124. The processing can include handover components 170 and 174 respectively for generating/processing multiple handover messages and channels, analyzing higher layer signaling from network layers, and/or increasing transmitter power for the respective messages or channels. In general, the handover message options 160 can be deployed by the wireless network 110 to increase probability of the receipt of a handover configuration message (or messages) by the user equipment (UE) 130. The respective options 160 reduce the stall time of data transfer during handover by increasing the probability of receipt of handover configuration message by the UE 130 which in turn results in improved handover performance. In one aspect, a quick repeat (or burst) of handover messages by the network is provided. Thus, when handover is triggered, the network 110 can automatically transmit handover messages on more than a single Hybrid Automatic Repeat Request (HARQ) process (or other communications process), for example. In another aspect, transmission of handover messages with higher power can be provided, where the network 110 can selectively increase the power of channels based on a higher layer indication of whether a given transmission carries or provides a handover message or not. In yet another aspect, a hybrid approach may be employed where multiple handover messages are generated and increased power is provided for the respective messages in order to further increase the probability of message receipt.

It is noted that the message options 160 are typically processed via the base stations 120 and 124. It is to be appreciated that other configurations are possible. For example, although not shown, the user equipment 130 could also process one or more aspects of initiating or facilitating a handover between stations or devices. In yet another aspect, a separate network device (not shown) could be employed to facilitate all or parts of a handover process. It is further noted that handover can occur between stations, between devices and stations, and/or between communications channels associated with a single station.

In another aspect, the handover message options can be processed according to various methods for wireless communications. The method includes triggering a handover process across the wireless network 110 and generating handover messages on more than a single communications process to facilitate receipt of the handover messages. Optionally, the methods include increasing the power associated with a communications channel in order to facilitate receipt of the handover messages. As noted above, hybrid methods can include increased power in conjunction with multiple message transmission. The handover messages can be generated according to a burst repeat process, where the burst includes multiple messages generated within a predetermined time period (e.g., generate at least two handover messages within 1 millisecond). The handover messages are typically transmitted according to a previously established communications link before a new communications link has been established. Also, the handover messages can be generated according to a radio link control (RLC) reset and data transfer process, where the radio link control reset and data transfer process is delayed until a handover complete message is generated by the user equipment 130.

The handover process can be associated with a Hybrid Automatic Repeat Request (HARQ) process that includes generating multiple Hybrid Automatic Repeat Request (HARQ) processes in accordance with the handover options 160. In one aspect, at least one handover message is generated per Hybrid Automatic Repeat Request (HARQ) process. In another aspect, multiple handover messages are generated per Hybrid Automatic Repeat Request (HARQ) process. The methods further include analyzing a Medium Access Control (MAC) layer to determine which handover messages have been transmitted and automatically discarding duplicate copies of handover messages after the handover has completed. The methods can include increasing the power of the handover messages on a physical downlink shared channel (PDSCH) and/or on a physical downlink control channel (PDCCH), for example. This can include analyzing a communications layer (e.g., MAC layer) to determine whether a given transmission carries a handover message. The respective methods employed by the system 100 will be described in more detail below with respect to FIGS. 3-5.

It is noted that the system 100 can be employed with an access terminal or mobile device, and can be, for instance, a module such as an SD card, a network card, a wireless network card, a computer (including laptops, desktops, personal digital assistants (PDAs)), mobile phones, smart phones, or any other suitable terminal that can be utilized to access a network. The terminal accesses the network by way of an access component (not shown). In one example, a connection between the terminal and the access components may be wireless in nature, in which access components may be the base station and the mobile device is a wireless terminal. For instance, the terminal and base stations may communicate by way of any suitable wireless protocol, including but not limited to Time Divisional Multiple Access (TDMA), Code Division Multiple Access (CDMA), Frequency Division Multiple Access (FDMA), Orthogonal Frequency Division Multiplexing (OFDM), FLASH OFDM, Orthogonal Frequency Division Multiple Access (OFDMA), or any other suitable protocol.

Access components can be an access node associated with a wired network or a wireless network. To that end, access components can be, for instance, a router, a switch, or the like. The access component can include one or more interfaces, e.g., communication modules, for communicating with other network nodes. Additionally, the access component can be a base station (or wireless access point) in a cellular type network, wherein base stations (or wireless access points) are utilized to provide wireless coverage areas to a plurality of subscribers. Such base stations (or wireless access points) can be arranged to provide contiguous areas of coverage to one or more cellular phones and/or other wireless terminals.

Figure 2:
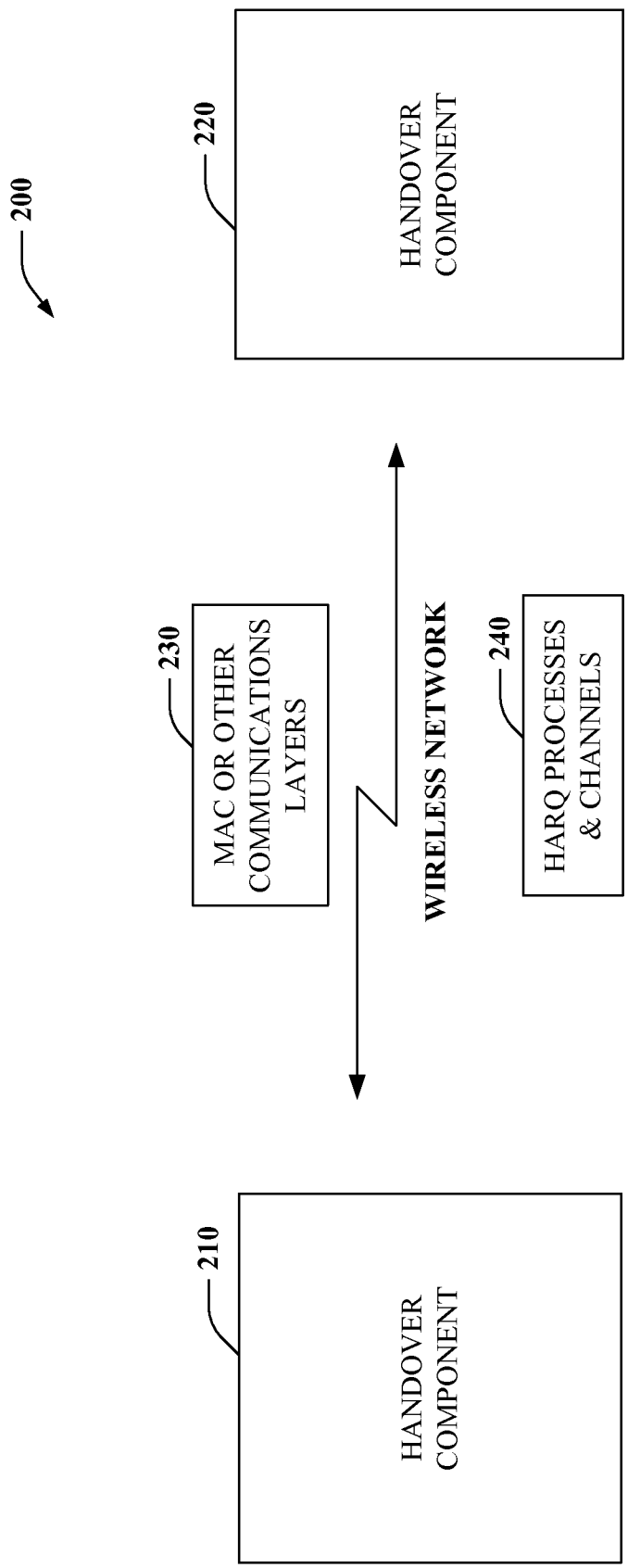
FIG. 2 is a diagram that illustrates example layers and channels for a wireless system.

Referring now to FIG. 2, a diagram 200 illustrates example channels and layers for a wireless system. As shown, handover components 210 and 220 (or other handover components not shown), were communications with communications layers 230 can include. For example, the layer 230 could include a Medium Access Control (MAC) layer among other network layers. Various channels and processes 240 can be provided for the communications between handover components 210 and 220 including HARQ processes and physical downlink shared and control channels (PDSCH, PDCCH). With respect to handover, it should be appreciated that there can be instances where a one Node-B (or more appropriately for these particular telecom standards "eNB") can hand communication off to a second eNB. Thus, the eNB losing communication with a UE may be referred to as the "source eNB" while the eNB gaining access to the UE may be referred to as the "target eNB."

With respect to the process 240, an Automatic Repeat-reQuest (ARQ) is an error control method for data transmission that uses acknowledgments and timeouts to achieve reliable data transmission. An acknowledgment is a message sent by the receiver to the transmitter to indicate that it has correctly received a data frame. A timeout is a reasonable point in time measured after the sender sends the data frame such that, if the sender does not receive an acknowledgment before the timeout, it usually re-transmits the frame until it receives an acknowledgment or exceeds a predefined number of re-transmissions.

A variation of ARQ is known as "Hybrid ARQ" (HARQ). The HARQ is generally considered to have improved performance—particularly over wireless channels—at the cost of increased implementation complexity. In HARQ processes 240, forward error correction (FEC) bits are also added to existing Error Detection (ED) bits. As a result, HARQ performs better than ordinary ARQ in poor signal conditions, but in its simplest form, this may come at the expense of lower throughput in good signal conditions.

Figure 3:
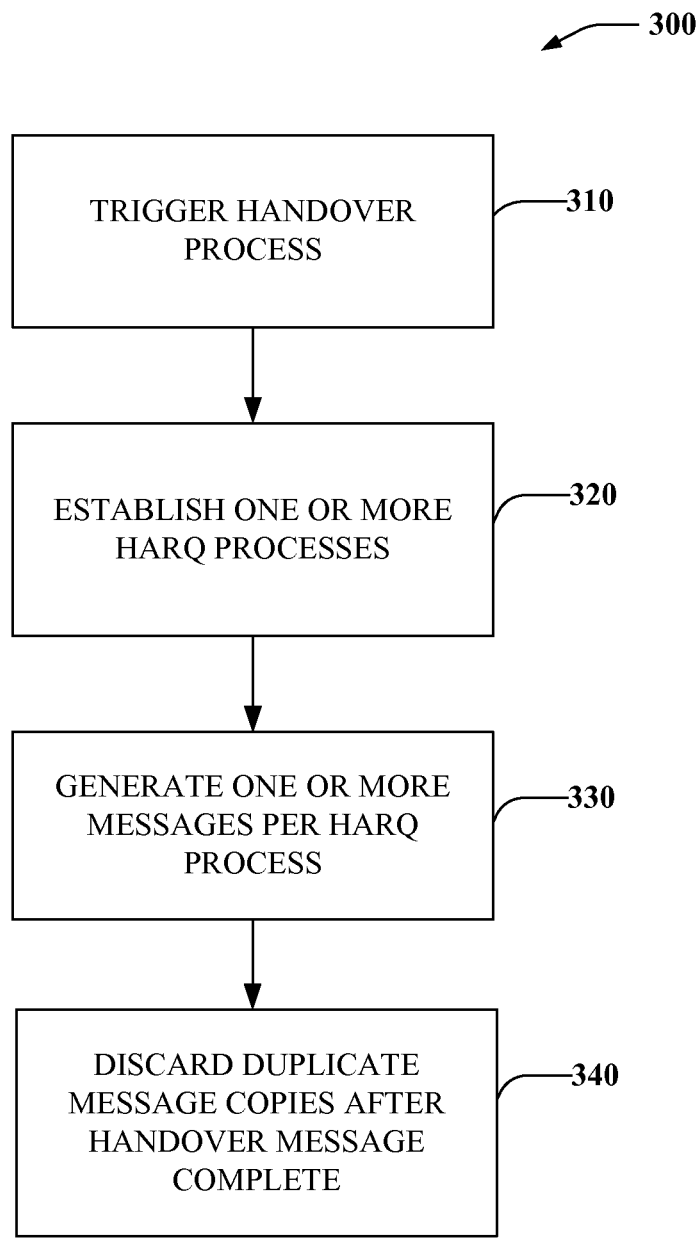
FIG. 3 is a flow diagram of a multiple handover message process for a wireless communication system.
Figure 4:
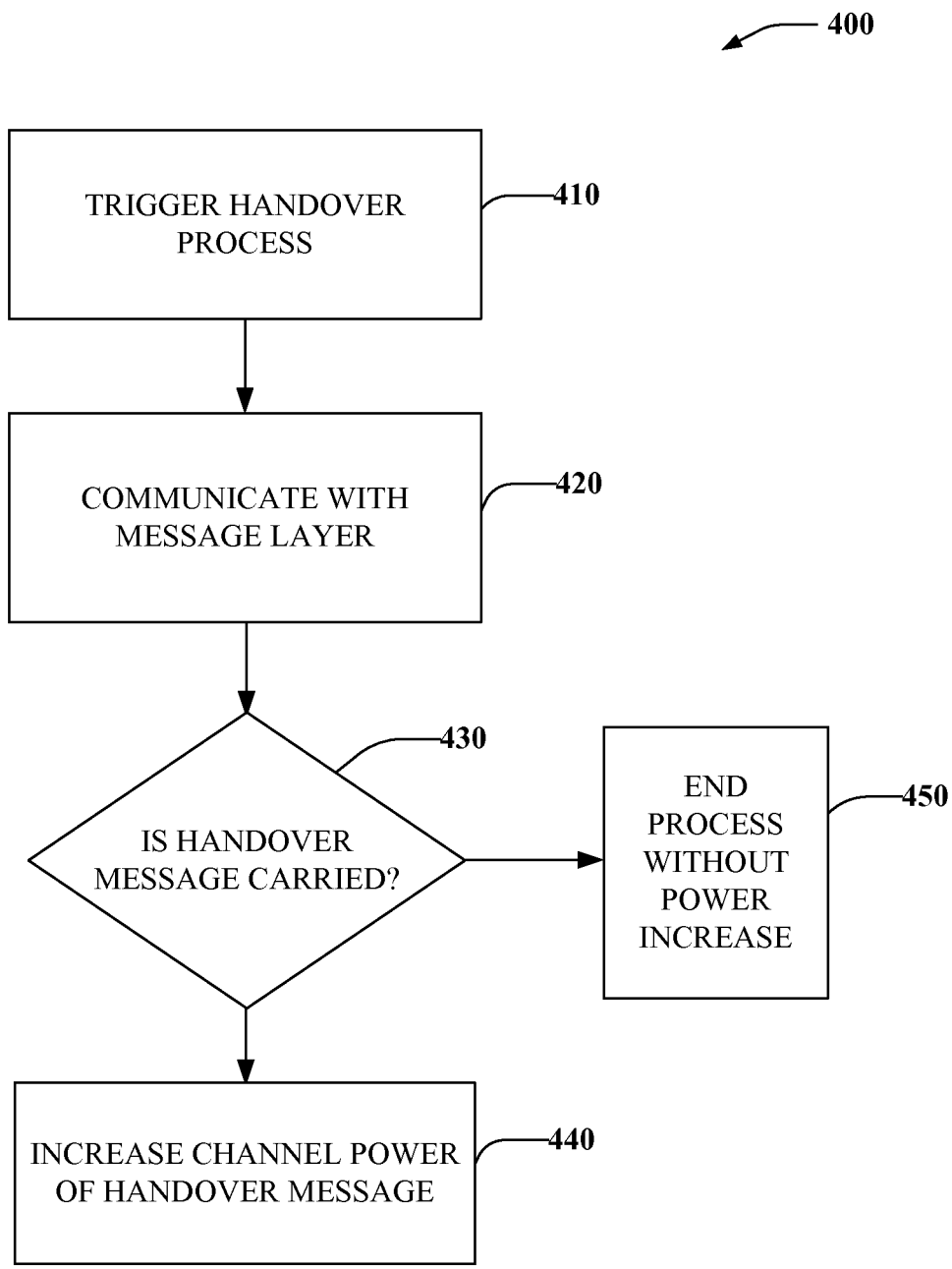
FIG. 4 is a flow diagram of a power adjustment process for handover messages in a wireless communication system.
Figure 5:
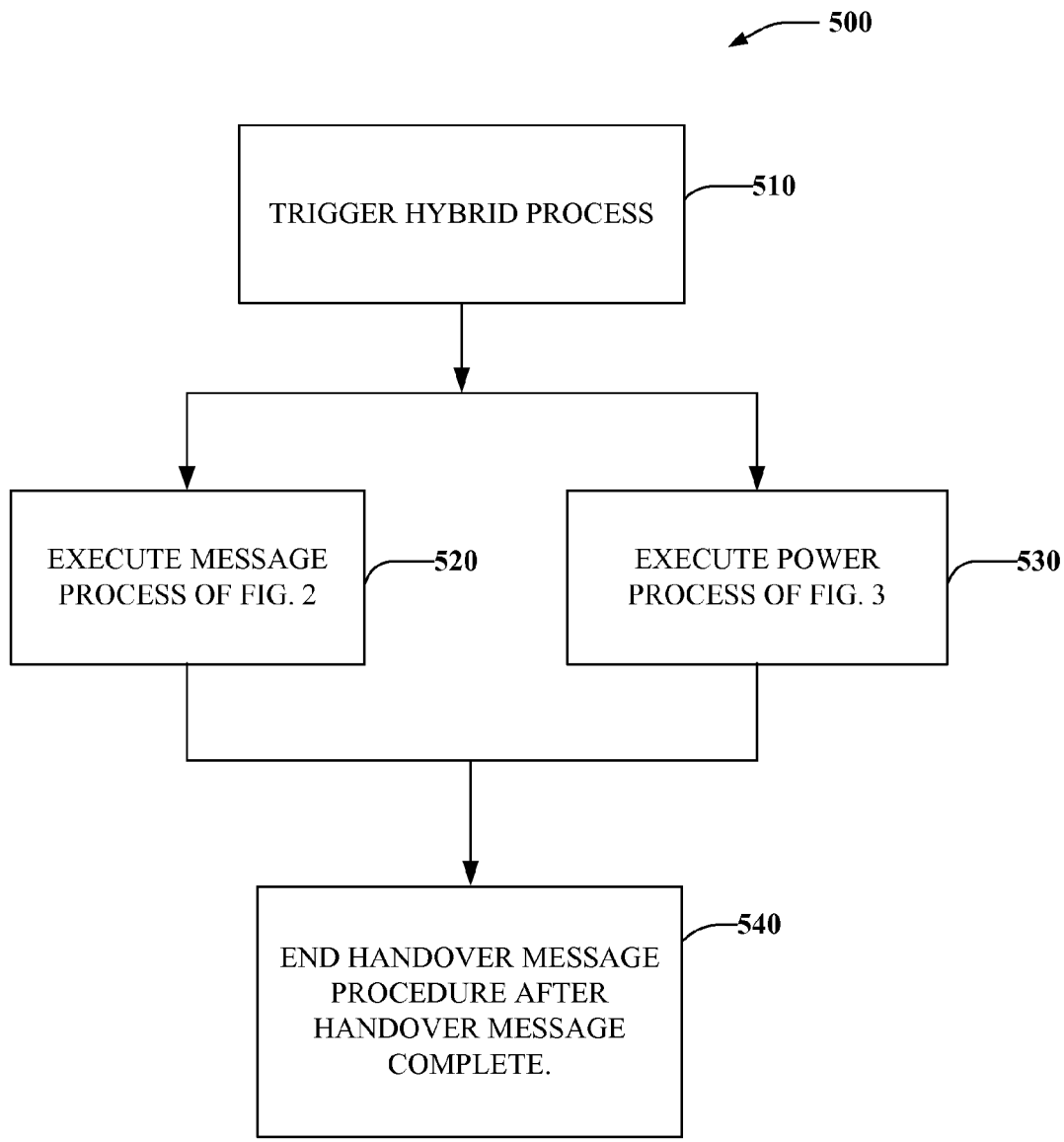
FIG. 5 is a flow diagram of a hybrid handover message process for a wireless communications system.

Referring now to FIGS. 3-5, wireless communications methodologies are illustrated. While, for purposes of simplicity of explanation, the methodologies (and other methodologies described herein) are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be utilized to implement a methodology in accordance with the claimed subject matter. In general, the process in FIGS. 3-5 improves the probability of handover messages being received by user equipment with minimum delay. This includes shorter stalls or delays during handover between nodes or devices, which can improve end user experience, especially with real-time delay sensitive services where handover outages are unacceptable.

FIG. 3 is a multiple handover message process 300 for a wireless communication system. In this aspect, a handover process is triggered at 310. This includes quick or burst repeats of handover messages by the network. When the handover is triggered at 310, then the network or node can automatically transmit handover messages on more than just a single HARQ process at 320. At 330, one or more handover messages are generated per the respective process of 320. This includes knowledge of handover messages being transferred by the MAC, such that duplicate transmissions on multiple or even all HARQ processes can be initiated at 330. Transmission of handover message over multiple HARQs (more than one) concurrently increases the probability of receipt of handover message by UE. At 340, duplicate copies received at the user equipment (UE) can be discarded.

FIG. 4 is a power adjustment process 400 for handover messages in a wireless communication system. In this aspect, and similar to FIG. 3 above, a handover process is triggered at 410. This includes transmission of handover messages with higher power. Thus, the network or nodes can selectively increase the power of PDSCH/PDCCH channels based on the higher layer indication at 420 of whether a given transmission carries or payloads a handover message or not. If the message is a handover message at 430, the network can increase the power of PDCCH/PDSCH at 440 to target a lower retransmission probability, which increases the probability of handover message being received by the user equipment (UE) on a quickly degrading radio link. This could be performed in a manner that still has minimal impact on interference for example by using left over power. If a handover message is not carried on a channel at 430, the process ends and channel power is thus not increased.

FIG. 5 is a hybrid handover message process 500 for a wireless communications system. In this aspect a hybrid process is triggered at 510, where messages can be quick repeated or burst with increased power on some or all the HARQs on which a handover message is being transmitted. This handover option provides a hybrid approach of the process 300 of FIG. 3 (shown at 520) and process 400 of FIG. 4 (shown at 530) to further increase the probability of handover message being received by the user equipment. At 540, the handover message procedure ends after a handover message complete is generated or received. It is noted, that during the hybrid process 500, that all or portions of the process acts depicted in FIGS. 3 and 4 respectively may be executed. For example, a single read of a message control layer may provide enough information to both generate multiple handover messages and increase the power on the channels in which the messages are transmitted.

The techniques processes described herein may be implemented by various means. For example, these techniques may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein. The software codes may be stored in memory unit and executed by the processors.

Figure 6:
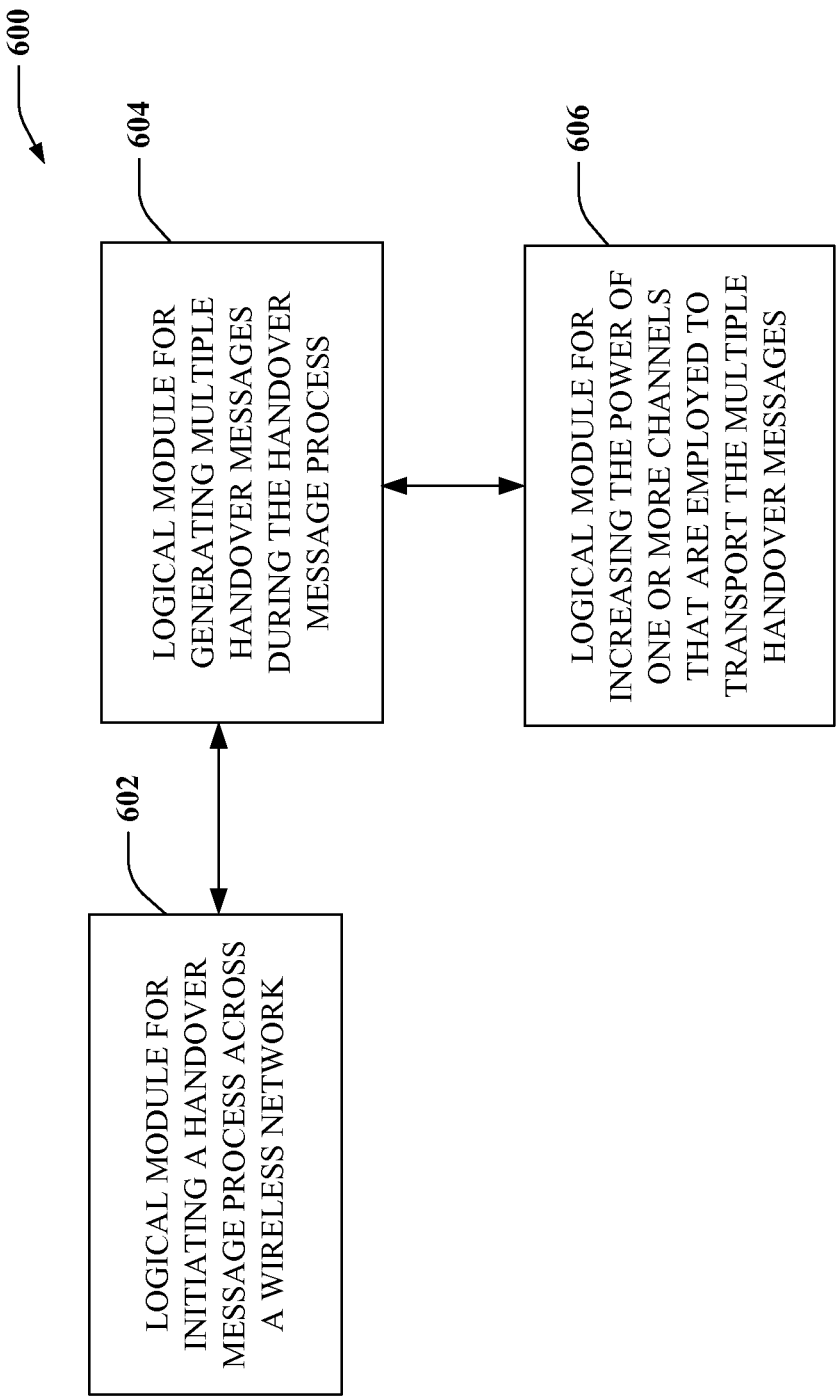
FIG. 6 illustrates an example logical module for a burst size processor.
Figure 7:
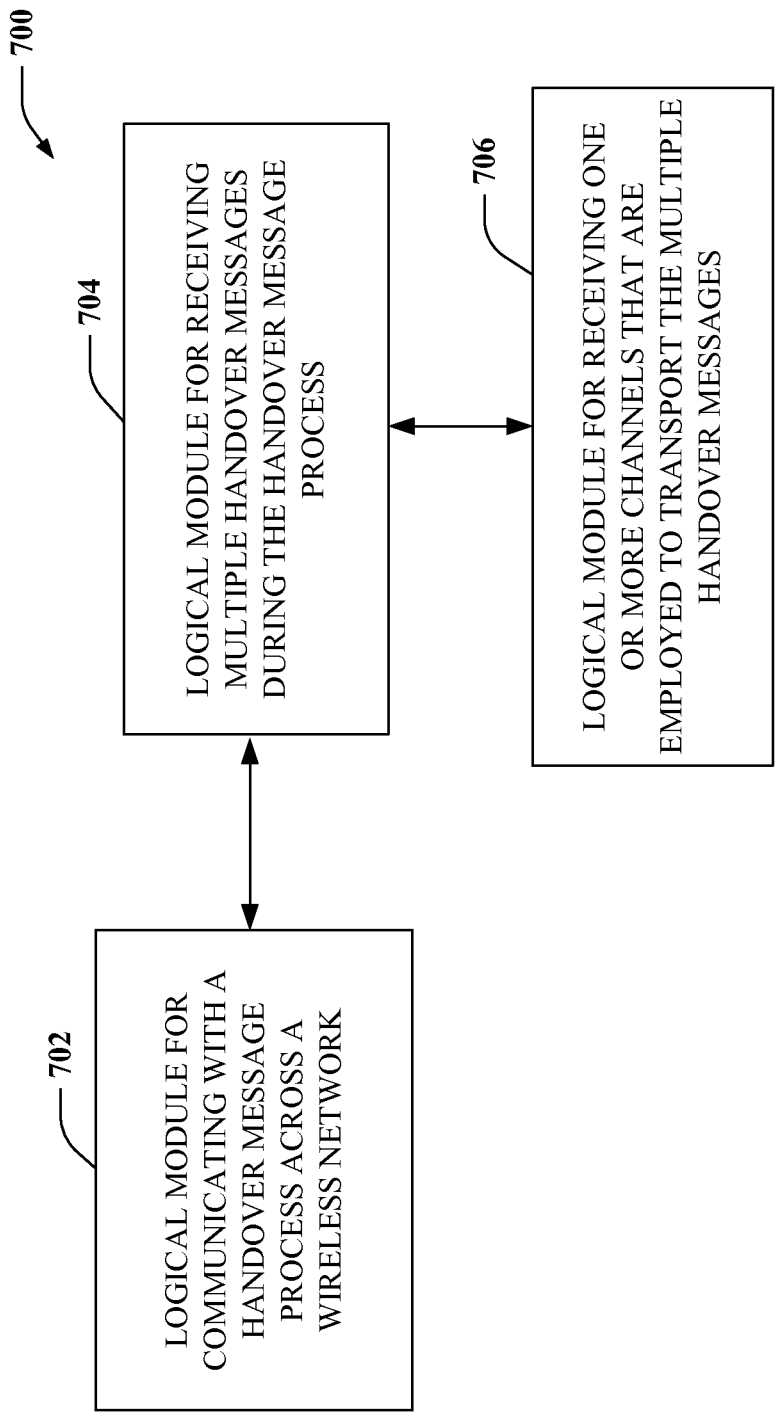
FIG. 7 illustrates an example logical module for an alternative burst size processor.

Turning now to FIGS. 6 and 7, a system is provided that relates to wireless signal processing. The systems are represented as a series of interrelated functional blocks, which can represent functions implemented by a processor, software, hardware, firmware, or any suitable combination thereof.

Referring to FIG. 6, a wireless communication system 600 is provided. The system 600 includes a logical module 602 or means for initiating a handover message process across a wireless network. This includes a logical module 604 or means for generating multiple handover messages during the handover message process. The system 600 also includes a logical module 606 or means for increasing the power of one or more channels that are employed to transport the multiple handover messages.

In one aspect, a method for wireless communications is provided. The method includes employing a processor executing computer executable instructions stored on a computer readable storage medium to implement the following acts: triggering a handover process across a wireless network; generating handover messages on more than a single communications process to facilitate receipt of the handover messages; or increasing a power level associated with a communications channel in order to facilitate receipt of the handover messages. The method further comprises generating the handover messages according to a burst repeat process, where the burst includes multiple messages generated within a predetermined time period. The handover messages are transmitted according to a previously established communications link before a new communications link has been established. The handover messages are generated according to a radio link control (RLC) reset and data transfer process, where the radio link control reset and data transfer process is delayed until a handover complete message is generated by user equipment. The handover process is associated with a Hybrid Automatic Repeat Request (HARQ) process and includes generating multiple Hybrid Automatic Repeat Request (HARQ) processes. This also includes generating at least one handover message per Hybrid Automatic Repeat Request (HARQ) process and generating multiple handover messages per Hybrid Automatic Repeat Request (HARQ) process. The method includes analyzing a Medium Access Control (MAC) layer to determine which handover messages have been transmitted and automatically discarding duplicate copies of handover messages. This includes increasing the power of the handover messages on a physical downlink shared channel (PDSCH) and/or increasing the power of handover messages on a physical downlink control channel (PDCCH). The method includes analyzing a communications layer to determine whether a given transmission carries a handover message.

In another aspect, a communications apparatus is provided. The apparatus includes a memory that retains instructions for generating a handover process across a wireless network, transmitting handover messages on more than a single communications process to facilitate receipt of the handover messages, and increasing the power associated with a node channel in order to facilitate receipt of the handover messages. The apparatus includes a processor that executes the instructions. This includes timing multiple handover messages according to a burst process, where the burst process includes multiple messages generated within a predetermined time period. The handover messages are generated according to a radio link control (RLC) reset and data transfer process, where the handover process is associated with a Hybrid Automatic Repeat Request (HARQ) process. The communications apparatus includes a component to generate multiple Hybrid Automatic Repeat Request (HARQ) processes, a component that generates at least one handover message per Hybrid Automatic Repeat Request (HARQ) process, and a component that generates multiple handover messages per Hybrid Automatic Repeat Request (HARQ) process. This includes a communications layer to determine which handover messages have been transmitted. The communications apparatus includes increasing the power of the handover messages on a physical downlink shared channel (PDSCH) or a physical downlink control channel (PDCCH).

In yet another aspect, a computer-readable medium is provided for generating multiple handover messages during a handover message process and increasing the power of one or more channels that are employed to transport the multiple handover messages, where power is increased on the channels when a handover message is detected. The computer-readable medium includes discarding duplicate handover messages.

In yet another aspect, a processor that executes the following instructions: initiating a handover message process across a wireless network; transmitting multiple handover messages during the handover message process; and raising a transmit power level of one or more channels that are employed to transport the multiple handover messages. The processor includes initiating a Hybrid Automatic Repeat Request (HARQ) process for the handover messages.

In another aspect, a method for wireless communications is provided. The method includes receiving multiple handover messages on one or more communications processes to facilitate receipt of handover messages and receiving the handover messages across communications channel having a raised transmission power in order to facilitate receipt of the handover messages. The method includes generating the handover messages according to a burst process, where the burst process includes multiple messages generated within a predetermined time period. The handover messages are generated according to a radio link control (RLC) reset and data transfer process. The method includes generating a handover process that is associated with a Hybrid Automatic Repeat Request (HARQ) process and analyzing a Medium Access Control (MAC) layer to determine which handover messages have been transmitted. This includes automatically discarding duplicate copies of handover messages and increasing the power of the handover messages on a physical downlink shared channel (PDSCH) or on a physical downlink control channel (PDCCH).

In yet another aspect, a communications apparatus is provided. The apparatus includes a memory that retains instructions for receiving a handover process across a wireless network, receiving handover messages on more than a single communications process to facilitate receipt of the handover messages, and increasing the power associated with a node in order to facilitate receipt of the handover messages. This includes a processor that executes the instructions and timing multiple handover messages according to a burst process, where the burst process includes multiple messages generated within a predetermined time period.

In another aspect, a computer-readable medium is provided that includes receiving multiple handover messages during a handover message process and increasing the power of one or more channels that are employed to transport the multiple handover messages, where power is increased on the channels when a handover message is detected. The computer-readable medium includes instructions to discard duplicate handover messages. This can also include analyzing or generating status for the messages.

In yet another aspect, processor is provided that executes the following instructions: receiving a handover message process across a wireless network; receiving multiple handover messages during the handover message process; and processing one or more raised power channels that are employed to transport the multiple handover messages. The processor includes initiating a Hybrid Automatic Repeat Request (HARQ) process for the handover messages.

Referring to FIG. 7, a wireless communication system 700 is provided. The system 700 includes a logical module 702 or means for communicating with a handover message process across a wireless network. The system 700 includes a logical module 704 or means for receiving multiple handover messages during the handover message process. This includes a logical module 706 or means for receiving one or more channels that are employed to transport the multiple handover messages.

Figure 8:
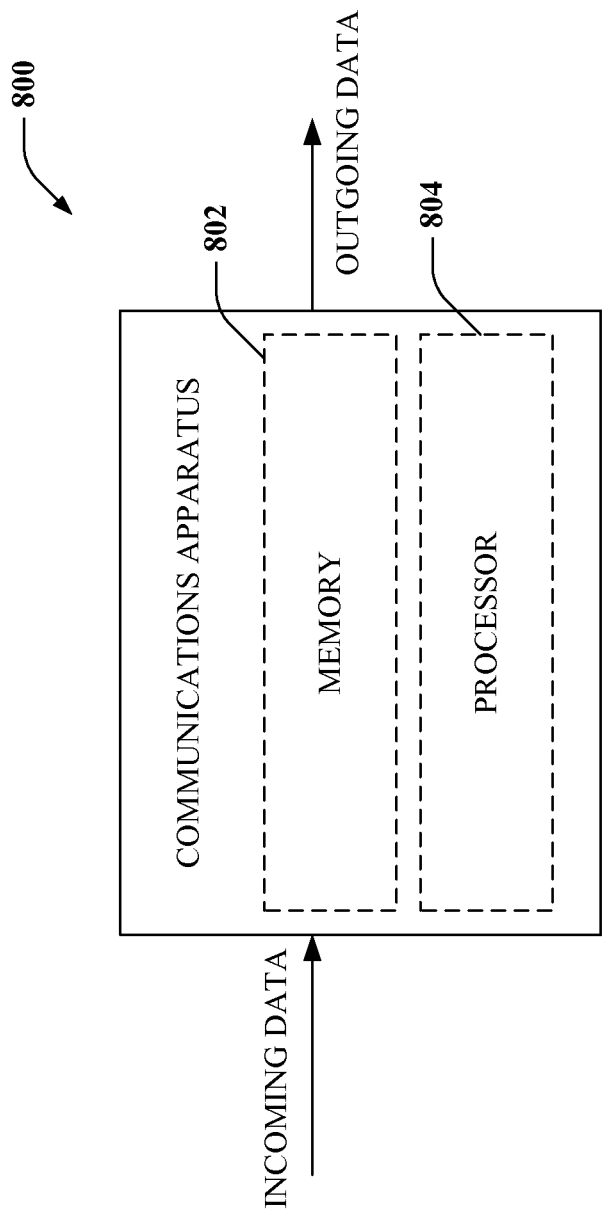
FIG. 8 illustrates an example communications apparatus that employs a wireless burst size processing.

FIG. 8 illustrates a communications apparatus 800 that can be a wireless communications apparatus, for instance, such as a wireless terminal. Additionally or alternatively, communications apparatus 800 can be resident within a wired network. Communications apparatus 800 can include memory 802 that can retain instructions for performing a signal analysis in a wireless communications terminal. Additionally, communications apparatus 800 may include a processor 804 that can execute instructions within memory 802 and/or instructions received from another network device, wherein the instructions can relate to configuring or operating the communications apparatus 800 or a related communications apparatus.

Figure 9:
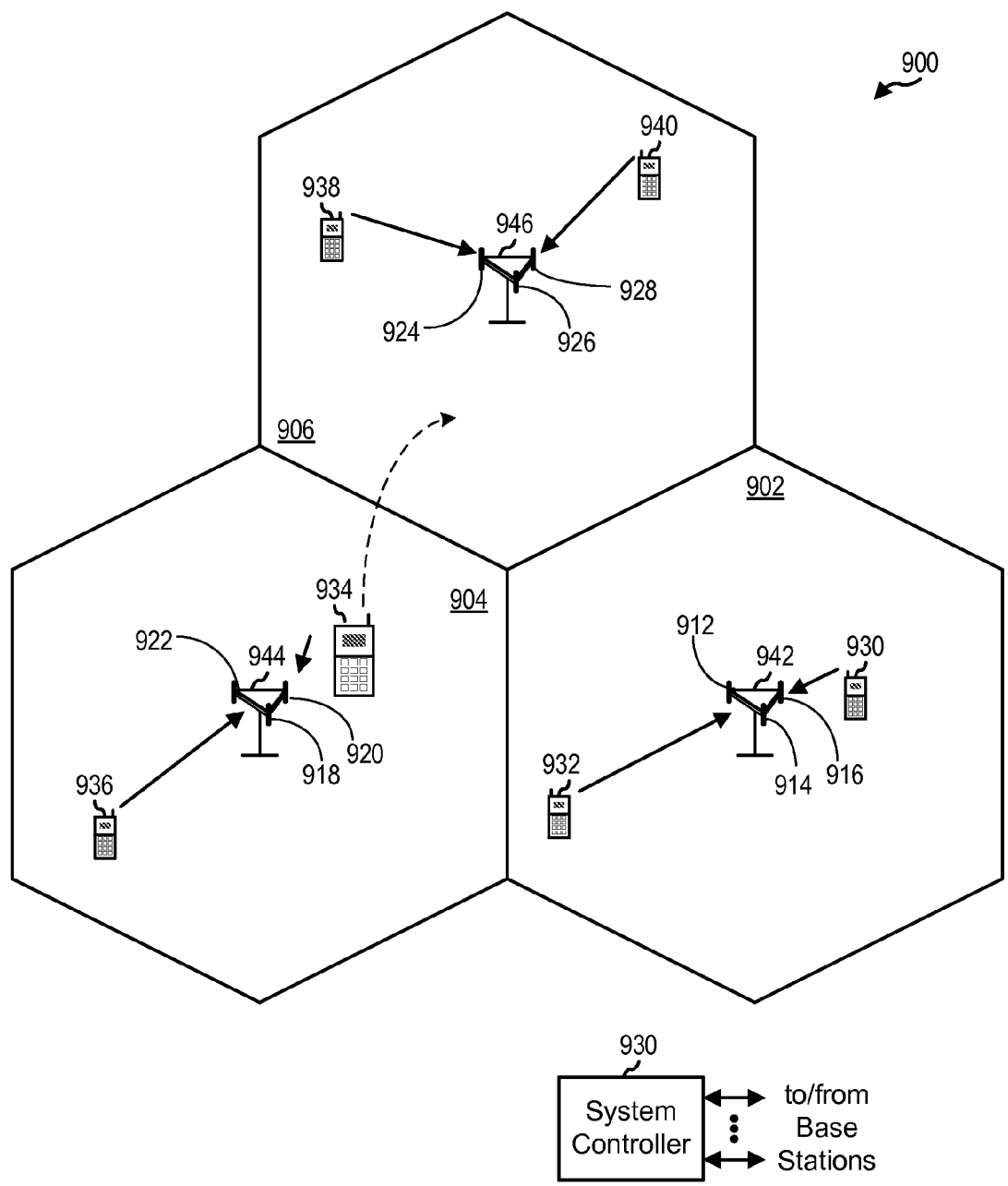
FIG. 9 illustrates a multiple access wireless communication system.

Referring to FIG. 9, a multiple access wireless communication system 900 is illustrated. The multiple access wireless communication system 900 includes multiple cells, including cells 902, 904, and 906. In the aspect the system 900, the cells 902, 904, and 906 may include a Node B that includes multiple sectors. The multiple sectors can be formed by groups of antennas with each antenna responsible for communication with UEs in a portion of the cell. For example, in cell 902, antenna groups 912, 914, and 916 may each correspond to a different sector. In cell 904, antenna groups 918, 920, and 922 each correspond to a different sector. In cell 906, antenna groups 924, 926, and 928 each correspond to a different sector. The cells 902, 904 and 906 can include several wireless communication devices, e.g., User Equipment or UEs, which can be in communication with one or more sectors of each cell 902, 904 or 906. For example, UEs 930 and 932 can be in communication with Node B 942, UEs 934 and 936 can be in communication with Node B 944, and UEs 938 and 940 can be in communication with Node B 946.

Figure 10:
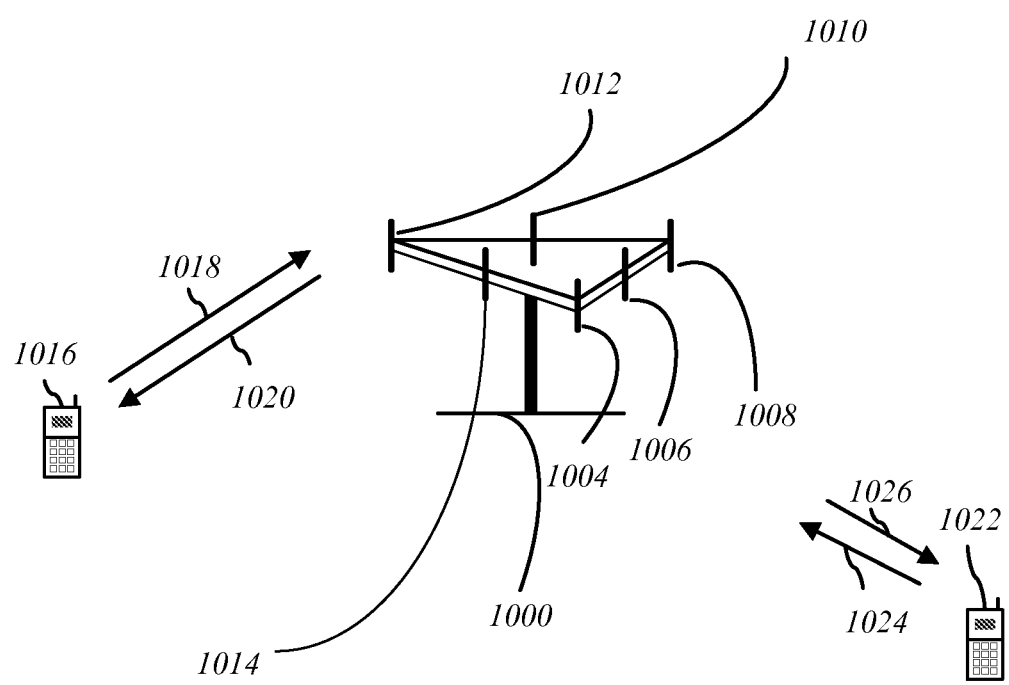
FIGS. 10 and 11 illustrate example communications systems.

Referring now to FIG. 10, a multiple access wireless communication system according to one aspect is illustrated. An access point 1000 (AP) includes multiple antenna groups, one including 1004 and 1006, another including 1008 and 1010, and an additional including 1012 and 1014. In FIG. 10, only two antennas are shown for each antenna group, however, more or fewer antennas may be utilized for each antenna group. Access terminal 1016 (AT) is in communication with antennas 1012 and 1014, where antennas 1012 and 1014 transmit information to access terminal 1016 over forward link 1020 and receive information from access terminal 1016 over reverse link 1018. Access terminal 1022 is in communication with antennas 1006 and 1008, where antennas 1006 and 1008 transmit information to access terminal 1022 over forward link 1026 and receive information from access terminal 1022 over reverse link 1024. In a FDD system, communication links 1018, 1020, 1024 and 1026 may use different frequency for communication. For example, forward link 1020 may use a different frequency then that used by reverse link 1018.

Each group of antennas and/or the area in which they are designed to communicate is often referred to as a sector of the access point. Antenna groups each are designed to communicate to access terminals in a sector, of the areas covered by access point 1000. In communication over forward links 1020 and 1026, the transmitting antennas of access point 1000 utilize beam-forming in order to improve the signal-to-noise ratio of forward links for the different access terminals 1016 and 1024. Also, an access point using beam-forming to transmit to access terminals scattered randomly through its coverage causes less interference to access terminals in neighboring cells than an access point transmitting through a single antenna to all its access terminals. An access point may be a fixed station used for communicating with the terminals and may also be referred to as an access point, a Node B, or some other terminology. An access terminal may also be called an access terminal, user equipment (UE), a wireless communication device, terminal, access terminal or some other terminology.

Figure 11:
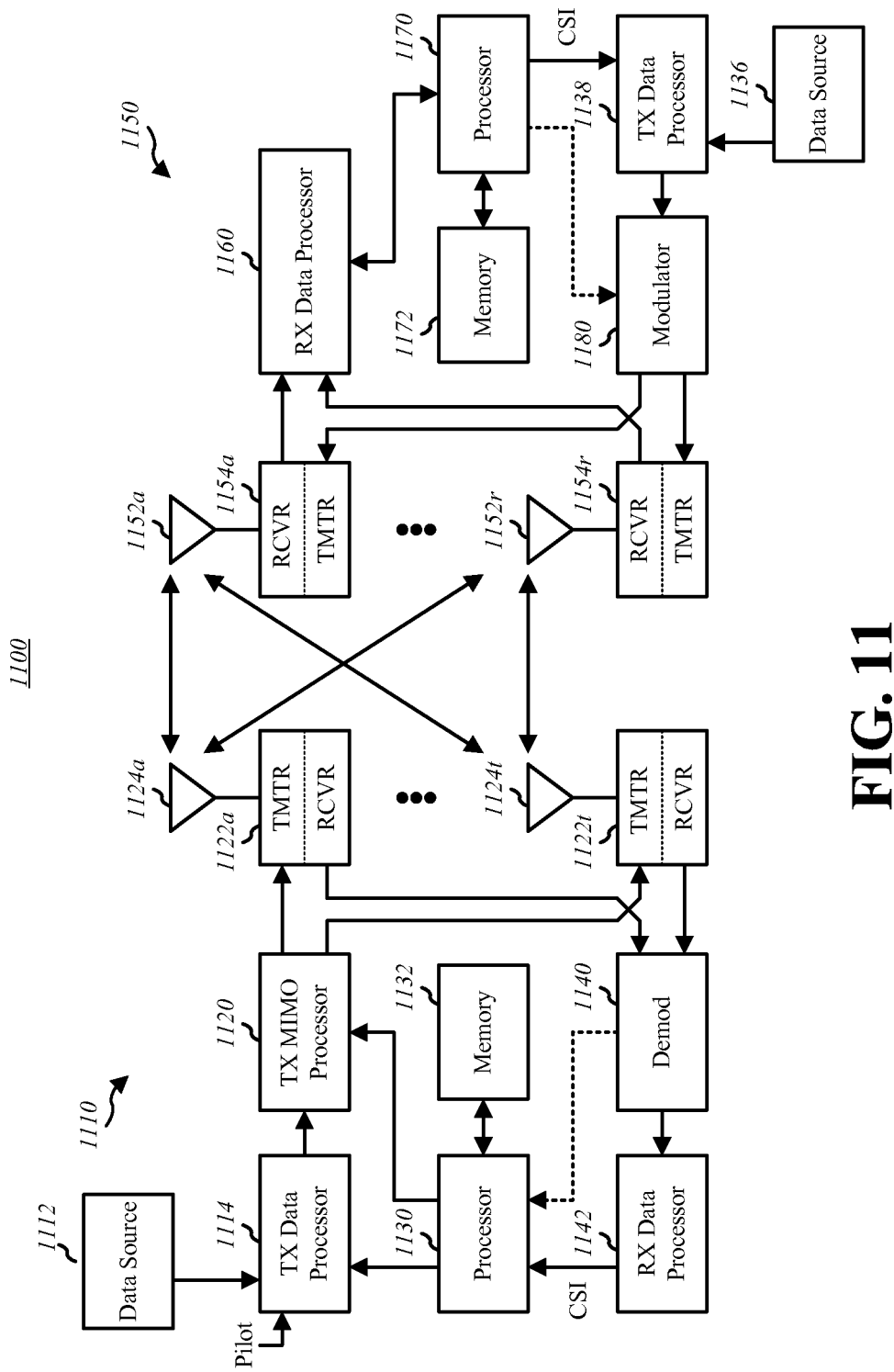

Referring to FIG. 11, a system 1100 illustrates a transmitter system 210 (also known as the access point) and a receiver system 1150 (also known as access terminal) in a MIMO system 1100. At the transmitter system 1110, traffic data for a number of data streams is provided from a data source 1112 to a transmit (TX) data processor 1114. Each data stream is transmitted over a respective transmit antenna. TX data processor 1114 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 1130.

The modulation symbols for all data streams are then provided to a TX MIMO processor 1120, which may further process the modulation symbols (e.g., for OFDM). TX MIMO processor 1120 then provides NT modulation symbol streams to NT transmitters (TMTR) 1122a through 1122t. In certain embodiments, TX MIMO processor 1120 applies beam-forming weights to the symbols of the data streams and to the antenna from which the symbol is being transmitted.

Each transmitter 1122 receives and processes a respective symbol stream to provide one or more analog signals, and further conditions (e.g., amplifies, filters, and up-converts) the analog signals to provide a modulated signal suitable for transmission over the MIMO channel. NT modulated signals from transmitters 1122a through 1122t are then transmitted from NT antennas 1124a through 1124t, respectively.

At receiver system 1150, the transmitted modulated signals are received by NR antennas 1152a through 1152r and the received signal from each antenna 1152 is provided to a respective receiver (RCVR) 1154a through 1154r. Each receiver 1154 conditions (e.g., filters, amplifies, and down-converts) a respective received signal, digitizes the conditioned signal to provide samples, and further processes the samples to provide a corresponding "received" symbol stream.

An RX data processor 1160 then receives and processes the NR received symbol streams from NR receivers 1154 based on a particular receiver processing technique to provide NT "detected" symbol streams. The RX data processor 1160 then demodulates, de-interleaves, and decodes each detected symbol stream to recover the traffic data for the data stream. The processing by RX data processor 1160 is complementary to that performed by TX MIMO processor 1120 and TX data processor 1114 at transmitter system 1110.

A processor 1170 periodically determines which pre-coding matrix to use (discussed below). Processor 1170 formulates a reverse link message comprising a matrix index portion and a rank value portion. The reverse link message may comprise various types of information regarding the communication link and/or the received data stream. The reverse link message is then processed by a TX data processor 1138, which also receives traffic data for a number of data streams from a data source 1136, modulated by a modulator 1180, conditioned by transmitters 1154a through 1154r, and transmitted back to transmitter system 1110.

At transmitter system 1110, the modulated signals from receiver system 1150 are received by antennas 1124, conditioned by receivers 1122, demodulated by a demodulator 1140, and processed by a RX data processor 1142 to extract the reserve link message transmitted by the receiver system 1150. Processor 1130 then determines which pre-coding matrix to use for determining the beam-forming weights then processes the extracted message.

In an aspect, logical channels are classified into Control Channels and Traffic Channels. Logical Control Channels comprises Broadcast Control Channel (BCCH) which is DL channel for broadcasting system control information. Paging Control Channel (PCCH) which is DL channel that transfers paging information. Multicast Control Channel (MCCH) which is Point-to-multipoint DL channel used for transmitting Multimedia Broadcast and Multicast Service (MBMS) scheduling and control information for one or several MTCHs. Generally, after establishing RRC connection this channel is only used by UEs that receive MBMS (Note: old MCCH+MSCH). Dedicated Control Channel (DCCH) is Point-to-point bi-directional channel that transmits dedicated control information and used by UEs having an RRC connection. Logical Traffic Channels comprise a Dedicated Traffic Channel (DTCH) which is Point-to-point bi-directional channel, dedicated to one UE, for the transfer of user information. Also, a Multicast Traffic Channel (MTCH) for Point-to-multipoint DL channel for transmitting traffic data.

Transport Channels are classified into DL and UL. DL Transport Channels comprises a Broadcast Channel (BCH), Downlink Shared Data Channel (DL-SDCH) and a Paging Channel (PCH), the PCH for support of UE power saving (DRX cycle is indicated by the network to the UE), broadcasted over entire cell and mapped to PHY resources which can be used for other control/traffic channels. The UL Transport Channels comprises a Random Access Channel (RACH), a Request Channel (REQCH), an Uplink Shared Data Channel (UL-SDCH) and plurality of PHY channels. The PHY channels comprise a set of DL channels and UL channels.

The DL PHY channels comprises: Common Pilot Channel (CPICH), Synchronization Channel (SCH), Common Control Channel (CCCH), Shared DL Control Channel (SDCCH), Multicast Control Channel (MCCH), Shared UL Assignment Channel (SUACH), Acknowledgement Channel (ACKCH), DL Physical Shared Data Channel (DL-PSDCH), UL Power Control Channel (UPCCH), Paging Indicator Channel (PICH), and Load Indicator Channel (LICH), for example.

The UL PHY Channels comprises: Physical Random Access Channel (PRACH), Channel Quality Indicator Channel (CQICH), Acknowledgement Channel (ACKCH), Antenna Subset Indicator Channel (ASICH), Shared Request Channel (SREQCH), UL Physical Shared Data Channel (UL-PSDCH), and Broadband Pilot Channel (BPICH), for example.

Other terms/components include: 3G 3rd Generation, 3GPP 3rd Generation Partnership Project, ACLR Adjacent channel leakage ratio, ACPR Adjacent channel power ratio, ACS Adjacent channel selectivity, ADS Advanced Design System, AMC Adaptive modulation and coding, A-MPR Additional maximum power reduction, ARQ Automatic repeat request, BCCH Broadcast control channel, BTS Base transceiver station, CDD Cyclic delay diversity, CCDF Complementary cumulative distribution function, CDMA Code division multiple access, CFI Control format indicator, Co-MIMO Cooperative MIMO, CP Cyclic prefix, CPICH Common pilot channel, CPRI Common public radio interface, CQI Channel quality indicator, CRC Cyclic redundancy check, DCI Downlink control indicator, DFT Discrete Fourier transform, DFT-SOFDM Discrete Fourier transform spread OFDM, DL Downlink (base station to subscriber transmission), DL-SCH Downlink shared channel, D-PHY 500 Mbps physical layer, DSP Digital signal processing, DT Development toolset, DVSA Digital vector signal analysis, EDA Electronic design automation, E-DCH Enhanced dedicated channel, E-UTRAN Evolved UMTS terrestrial radio access network, eMBMS Evolved multimedia broadcast multicast service, eNB Evolved Node B, EPC Evolved packet core, EPRE Energy per resource element, ETSI European Telecommunications Standards Institute, E-UTRA Evolved UTRA, E-UTRAN Evolved UTRAN, EVM Error vector magnitude, and FDD Frequency division duplex.

Still yet other terms include FFT Fast Fourier transform, FRC Fixed reference channel, FS1 Frame structure type 1, FS2 Frame structure type 2, GSM Global system for mobile communication, HARQ Hybrid automatic repeat request, HDL Hardware description language, HI HARQ indicator, HSDPA High speed downlink packet access, HSPA High speed packet access, HSUPA High speed uplink packet access, IFFT Inverse FFT, IOT Interoperability test, IP Internet protocol, LO Local oscillator, LTE Long term evolution, MAC Medium access control, MBMS Multimedia broadcast multicast service, MBSFN Multicast/broadcast over single-frequency network, MCH Multicast channel, MIMO Multiple input multiple output, MISO Multiple input single output, MME Mobility management entity, MOP Maximum output power, MPR Maximum power reduction, MU-MIMO Multiple user MIMO, NAS Non-access stratum, OBSAI Open base station architecture interface, OFDM Orthogonal frequency division multiplexing, OFDMA Orthogonal frequency division multiple access, PAPR Peak-to-average power ratio, PAR Peak-to-average ratio, PBCH Physical broadcast channel, P-CCPCH Primary common control physical channel, PCFICH Physical control format indicator channel, PCH Paging channel, PDCCH Physical downlink control channel, PDCP Packet data convergence protocol, PDSCH Physical downlink shared channel, PHICH Physical hybrid ARQ indicator channel, PHY Physical layer, PRACH Physical random access channel, PMCH Physical multicast channel, PMI Pre-coding matrix indicator, P-SCH Primary synchronization signal, PUCCH Physical uplink control channel, and PUSCH Physical uplink shared channel.

Other terms include QAM Quadrature amplitude modulation, QPSK Quadrature phase shift keying, RACH Random access channel, RAT Radio access technology, RB Resource block, RF Radio frequency, RFDE RF design environment, RLC Radio link control, RMC Reference measurement channel, RNC Radio network controller, RRC Radio resource control, RRM Radio resource management, RS Reference signal, RSCP Received signal code power, RSRP Reference signal received power, RSRQ Reference signal received quality, RSSI Received signal strength indicator, SAE System architecture evolution, SAP Service access point, SC-FDMA Single carrier frequency division multiple access, SFBC Space-frequency block coding, S-GW Serving gateway, SIMO Single input multiple output, SISO Single input single output, SNR Signal-to-noise ratio, SRS Sounding reference signal, S-SCH Secondary synchronization signal, SU-MIMO Single user MIMO, TDD Time division duplex, TDMA Time division multiple access, TR Technical report, TrCH Transport channel, TS Technical specification, TTA Telecommunications Technology Association, TTI Transmission time interval, UCI Uplink control indicator, UE User equipment, UL Uplink (subscriber to base station transmission), UL-SCH Uplink shared channel, UMB Ultra-mobile broadband, UMTS Universal mobile telecommunications system, UTRA Universal terrestrial radio access, UTRAN Universal terrestrial radio access network, VSA Vector signal analyzer, W-CDMA Wideband code division multiple access.

It is noted that various aspects are described herein in connection with a terminal. A terminal can also be referred to as a system, a user device, a subscriber unit, subscriber station, mobile station, mobile device, remote station, remote terminal, access terminal, user terminal, user agent, or user equipment. A user device can be a cellular telephone, a cordless telephone, a Session Initiation Protocol (SIP) phone, a wireless local loop (WLL) station, a PDA, a handheld device having wireless connection capability, a module within a terminal, a card that can be attached to or integrated within a host device (e.g., a PCMCIA card) or other processing device connected to a wireless modem.

Moreover, aspects of the claimed subject matter may be implemented as a method, apparatus, or article of manufacture using standard programming and/or engineering techniques to produce software, firmware, hardware, or any combination thereof to control a computer or computing components to implement various aspects of the claimed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving voice mail or in accessing a network such as a cellular network. Of course, those skilled in the art will recognize many modifications may be made to this configuration without departing from the scope or spirit of what is described herein.

As used in this application, the terms "component," "module," "system," "protocol," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for wireless communications, comprising:
triggering a handover process for handover of a wireless device between base stations across a wireless network;
transmitting handover messages from a base station to the wireless device on more than a single communications process to facilitate receipt of at least one of the handover messages by the wireless device, wherein a repeated transmission of at least two of the handover messages occurs without awaiting a response from the wireless device; and
increasing a power level associated with a communications channel carrying one or more of the handover messages by the base station.

2. The method of claim 1, further comprising generating the handover messages according to a burst repeat process, where a burst includes multiple handover messages repeated within a predetermined time period.

3. The method of claim 1, wherein the handover messages are transmitted according to a previously established communications link before a new communications link has been established.

4. The method of claim 1, wherein the handover messages are generated according to a radio link control (RLC) reset and data transfer process.

5. The method of claim 4, wherein the RLC reset and data transfer process is delayed until a handover complete message is received from a user equipment.

6. The method of claim 1, wherein the handover process is associated with a Hybrid Automatic Repeat Request (HARQ) process.

7. The method of claim 6, further comprising generating multiple HARQ processes.

8. The method of claim 7, further comprising generating at least one handover message per HARQ process.

9. The method of claim 8, further comprising generating multiple handover messages per HARQ process.

10. The method of claim 9, further comprising analyzing a Medium Access Control (MAC) layer to determine which of the handover messages have been transmitted.

11. The method of claim 1, further comprising increasing a power level of a physical downlink shared channel (PDSCH) for transmission of at least one of the handover messages.

12. The method of claim 1, further comprising increasing a power level of a physical downlink control channel (PDCCH) for transmission of at least one of the handover messages.

13. The method of claim 1, further comprising analyzing a communications layer to determine whether a given transmission carries a handover message before increasing the power level.

14. A communications apparatus, comprising:
a memory that retains instructions for transmitting, at a base station, handover messages for handover of a wireless device between base stations on more than a single communications process to facilitate receipt of at least one of the handover messages by the wireless device, wherein a repeated transmission of at least two of the handover messages occurs without awaiting a response from the wireless device; and increasing, at the base station, a power level associated with a node channel carrying one or more of the handover messages; and
a processor that executes the instructions.

15. The communications apparatus of claim 14, wherein the memory further retains instructions for timing the handover messages according to a burst process, where the burst process comprises repeating multiple handover messages within a predetermined time period.

16. The communications apparatus of claim 14, wherein the handover messages are generated according to a radio link control (RLC) reset and data transfer process.

17. The communications apparatus of claim 14, wherein the handover process is associated with a Hybrid Automatic Repeat Request (HARQ) process.

18. The communications apparatus of claim 17, further comprising a component to generate multiple HARQ processes.

19. The communications apparatus of claim 18, wherein the component generates at least one handover message per HARQ process.

20. The communications apparatus of claim 19, wherein the component generates multiple handover messages per HARQ process.

21. The communications apparatus of claim 20, wherein the memory further retains instructions for analyzing a communications layer to determine which of the handover messages have been transmitted.

22. The communications apparatus of claim 14, wherein the memory further retains instructions for increasing the power level of the handover messages on at least one of a physical downlink shared channel (PDSCH) or a physical downlink control channel (PDCCH).

23. A communications apparatus, comprising:
means for initiating a handover process for handover of a wireless device between base stations across a wireless network;
a transmitter at a base station configured to transmit multiple handover messages to the wireless device during the handover process, wherein a repeated transmission of at least two of the multiple handover messages occurs without awaiting a response from the wireless device; and
means for increasing, at the base station, a power level of one or more channels that are employed to transport the multiple handover messages.

24. A non-transitory computer-readable storage medium, comprising:
code for causing at least one computer to transmit, at a base station, multiple handover messages to a wireless device during a handover process for handover of the wireless device between base stations, wherein a repeated transmission of at least two of the handover messages occurs without awaiting a response from the wireless device; and
code for causing the at least one computer to increase, at the base station, a power level of one or more channels that are employed to transport the multiple handover messages.

25. A processor that executes the following:
initiating a handover process across a wireless network;
transmitting, at a base station, multiple handover messages to a wireless device during the handover process for handover of the wireless device between base stations, wherein a repeated transmission of at least two of the handover messages occurs without awaiting a response from the wireless device; and
raising, at the base station, a transmit power level of one or more channels that are employed to transport the multiple handover messages.

26. The processor of claim 25, wherein the processor further executes initiating a Hybrid Automatic Repeat Request (HARQ) process for the handover messages.

27. A method, operational on a mobile device, for wireless communications, comprising:
receiving, from a base station, at least one of multiple handover messages on one or more communications processes for handover of the mobile device between base stations, wherein the multiple handover messages are transmitted to facilitate receipt of the at least one of the handover messages, wherein the multiple handover messages comprise a handover message transmission repeated by the base station without awaiting a response from the mobile device; and
receiving the at least one of the multiple handover messages across communications channels having a transmission power raised at the base station.

28. The method of claim 27, wherein the multiple handover messages are generated according to a burst process, where the burst process comprises repeating handover messages within a predetermined time period.

29. The method of claim 27, wherein the multiple handover messages are generated according to a radio link control (RLC) reset and data transfer process.

30. The method of claim 27, wherein the one or more communications processes is associated with a Hybrid Automatic Repeat Request (HARM) process.

31. The method of claim 27, further comprising analyzing a Medium Access Control (MAC) layer to determine which of the multiple handover messages have been transmitted.

32. The method of claim 27, further comprising automatically discarding any duplicate copies of received handover messages.

33. The method of claim 27, wherein receiving the at least one of the multiple handover messages comprises receiving the at least one of the multiple handover messages on at least one of a physical downlink shared channel (PDSCH) or on a physical downlink control channel (PDCCH) with an increased power level.

34. A communications apparatus, comprising:
a memory that retains instructions for receiving, from a base station, at least one of multiple handover messages on more than a single communications process for handover of the communication apparatus between base stations, wherein the multiple handover messages are transmitted to facilitate receipt of the at least one of the handover messages, wherein the multiple handover messages comprise a handover message transmission repeated by the base station without awaiting a response from the communications apparatus; and receiving the at least one of the multiple handover messages across communication channels having a transmission power raised at the base station; and
a processor that executes the instructions.

35. The communications apparatus of claim 34, wherein the at least one of the multiple handover messages is generated according to a burst process, where the burst process includes multiple handover messages generated within a predetermined time period.

36. A communications apparatus, comprising:
means for communicating with a handover process for handover of the communications apparatus between base stations across a wireless network;
a receiver configured to receive, from a base station, at least one of multiple handover messages during the handover process, wherein the multiple handover messages comprise a handover message transmission repeated by the base station without awaiting a response from the communications apparatus; and
means for receiving the at least one of the multiple handover messages on one or more channels that are employed to transport the multiple handover messages, wherein power in at least one channel in the one or more channels is raised, at the base station, to facilitate receipt of the at least one of the multiple handover messages.

37. The communications apparatus of claim 36, wherein the power in the at least one channel is raised based on a status from a communications layer.

38. A non-transitory computer-readable storage medium, comprising:
code for causing at least one computer to receive, from a base station, a least one of multiple handover messages on more than a single communications process for handover of a mobile device between base stations, wherein the multiple handover messages are transmitted to facilitate receipt of the at least one of the handover messages by the mobile device, wherein the multiple handover messages comprise a handover message transmission repeated by the base station without awaiting a response from the mobile device; and
code for causing at least one computer to receive the at least one of the multiple handover messages across communication channels having a transmission power raised at the base station.

39. The non-transitory computer-readable storage medium of claim 38, further comprising code for causing at least one computer to discard duplicate received handover messages.

40. A processor that executes the following:
communicating with a handover process across a wireless network for handover of a mobile device between base stations;
receiving, from a base station, at least one of multiple handover messages during the handover process, wherein the multiple handover messages comprise a handover message transmission repeated by the base station without awaiting a response from the mobile device; and
processing the at least one of the multiple handover messages received on one or more channels that are employed to transport the at least one of the multiple handover messages, wherein the one or more channels comprise a power level raised at the base station in order to facilitate receipt of the at least one of the multiple handover messages.

41. The processor of claim 40, wherein the at least one of the multiple handover messages is received on a Hybrid Automatic Repeat Request (HARQ) process.

* * * * *